Oct. 4, 1966 H. H. TODD 3,276,919
PROCESS FOR FORMING METAL STRUCTURES
HAVING VERY FINE PORES
Filed Oct. 28, 1963
*Fig. 1*
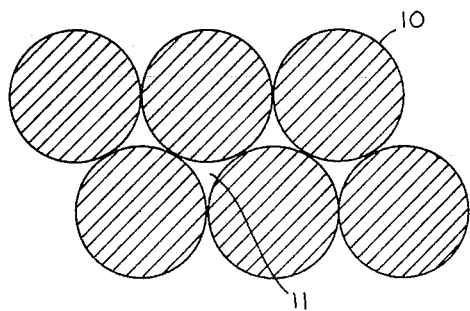
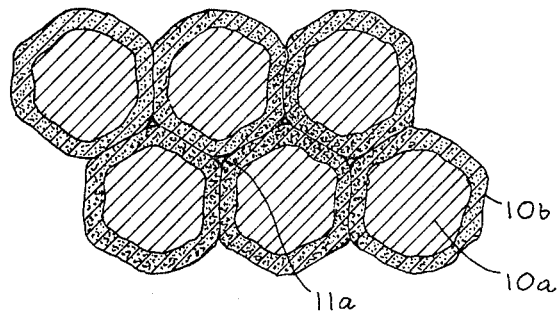
*Fig. 2*
HOYT H. TODD
INVENTOR.
BY Allen E. Botney
ATTORNEY

United States Patent Office 3,276,919
Patented Oct. 4, 1966

3,276,919
PROCESS FOR FORMING METAL STRUCTURES HAVING VERY FINE PORES
Hoyt H. Todd, La Habra, Calif., assignor to Electro-Optical Systems, Inc., Pasadena, Calif.
Filed Oct. 28, 1963, Ser. No. 319,464
6 Claims. (Cl. 148—13.1)

The present invention relates to the metallurgical arts in general and more particularly relates to a porous metal structure and to a method for making such a structure.

For many applications, a stable porous metallic structure of high surface area and with very fine pores would be extremely desirable. By way of example, structures of this kind could be used as filters, as fuel cell plates, as diffusion columns, as catalysts and also as ionizing devices.

However, porous materials of extremely small pore diameter cannot be produced by standard powder or fiber metallurgy techniques. More specifically, if a metallic powder of extremely small diameter, say 4 microns or less, is pressed into a compact briquet or form and then sintered, densification will be very rapid as a result of the high surface energy of the powder. This rapid densification results, first, in pore closure of these pores of fine diameter and if sintering is continued, it will also result in a body that is impermeable to gas or other fluid flow. Consequently, the production of porous material by powder metallurgy methods requires the use of powder of sufficiently large particle diameter to insure that densification occurring during sintering will not result in pore closure. However, material produced from powder in this size range contains pore openings much larger than would be optimum for the many applications to which such material could be put, some of which were mentioned above.

It is, therefore, an object of the present invention to provide a process by means of which a metal structure having very fine pores can be produced.

It is another object of the present invention to provide a porous metal structure whose pores are very fine.

It is a further object of the present invention to provide a metallic porous material containing extremely small pore openings and a large internal surface area.

The disadvantages and limitations of prior art techniques are substantially overcome and the above-stated objects are achieved by means of the present invention. More specifically, the pore openings in a porous metal structure can be reduced in size and the structure's internal surface area greatly increased and, in the accordance with the basic concept of the invention, this can be done by the process of first forming a chemical conversion layer on its internal surface and then reducing this conversion layer back to the original base metal. By way of specific example, if the porous material is carefully oxidized by heating it in oxygen for a selected period of time and within a predetermined temperature range, each individual wire or particle making up the structure can be coated with an adherent layer of oxide. This oxide is crystalline, the crystal lattice being composed of oxygen and metal atoms in an arranged structure. The depth of this oxide layer will depend upon the time and temperature of heating. Since the metallic oxide is of lower density than the metal, the oxide layer as produced will occupy a larger volume than the prior parent metal. As a result, the open pores within the porous material will be reduced in size. Of course, if the oxidation process is carried to a sufficient degree, the oxide produced will completely close the pores, a situation to be avoided.

After the oxidation process is carried to the proper depth, the porous material is cooled, and then heated in a reducing atmosphere for a time and at a temperature sufficient to reduce the oxide back to the metallic condition. After reduction, the resulting metal continues to retain the volume occupied by the oxide, thereby producing a porous cellular metal structure of greatly increased surface area. The reduced metal is well bonded to the surface of the parent metal.

This oxidation-reduction process accomplishes a number of objectives, these being (a) to reduce the permeability of the porous material, permeability being a measure of the rate of flow through the porous material, (b) to reduce the diameter of the wire or powder making up the metal structure, thereby reducing the spacing between pores, and (c) to greatly increase the surface area of the structure.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIGURE 1 illustrates a porous metal structure in cross-section before it is treated by the process of the present invention; and FIGURE 2 illustrates the same porous structure after treatment.

Considering now the drawing, reference is made to FIG. 1 wherein is shown a porous metal body or structure to which the process of the present invention is to be applied and by means of which the size of the pores will be greatly decreased but the structure's surface area greatly increased. The structure may be in the form of a disc, plate, or the like, and may be composed of either small metal particles compacted together or a bunch of thin metal strands or fibers. For purposes of illustration, a bunch of metal fibers 10 are used in the FIG. 1 structure, the spaces or pores between them being designated 11.

In applying the process, the FIG. 1 structure is first heated in air at a temperature in the range of from 750° to 850° Fahrenheit, preferably at 850° Fahrenheit since this appears to be an optimum temperature. How long the structure should be heated in this manner is determined by the pore sizes ultimately desired, with the result that heating time may be minutes or it may be hours. In heating the structure in this way, a tightly adhering metal oxide, which may be termed the conversion layer, is formed over the entire surface of the structure, including the interior surface of each pore. Since the density of the metallic oxide thusly formed is less than that of the parent metal, an increase in the volume of the structure is brought about during the formation of the conversion layer, thereby reducing pore size and increasing surface area, as desired.

The next step in the process is that of reducing the above said conversion layer back to the original base metal. Accordingly, the metal structure is placed in a hydrogen atmosphere and there heated for deoxidation purposes to a temperature of about 1800° Fahrenheit. It is kept at that temperature until no further loss in weight occurs, that is to say, until reduction is complete. After it is cooled, the porous metal structure resembles the structure shown in FIG. 2 wherein the solid cores of the wire fibers used in the structure are designated 10a and the expanded layers around them, which are now layers of the original base metal, are designated 10b. The pores in the treated structure, on the other hand, are designated 11a and it will be noted from the figure that pores 11a, due to layers 10b, are considerably reduced in size.

The objectives of the present invention are therefore realized.

By way of a specific example of the application of the present process, three porous tungsten plugs were produced from six-micron tungsten wire. Permeability measurements made on these plugs before treatment were as follows: (a) 19.89 seconds; (b) 22.60 seconds; and (c) 19.62 seconds; where the above times refer to the number of seconds required for a given volume of gas to flow through the plugs under standardized conditions of pressure and temperature. The above porous buttons or plugs were then heated in air for 20 minutes at 850° Fahrenheit. At this temperature, a tightly adherent coating of tungsten oxide ($WO_2$) formed over the interior surface of each pore. Since the density of $WO_2$ is 12.1 compared to 19.3 for metallic tungsten, an increase in volume occurred during formation of the conversion layer. The oxygen was now removed from the conversion layers by placing the plugs in a hydrogen furnace and heating to 1000° centigrade (about 1800° Fahrenheit) for 15 minutes. Permeability measurements were then made once again and the results were as follows: (a) 40.35 seconds; (b) 49.60 seconds; and (c) 41.67 seconds.

By way of explanation, the removal of the oxygen atom from the $WO_2$ crystal lattice creates a very small vacancy in the tungsten network, the size of this vacancy and, therefore, the density of the conversion layer being controlled by selection of the specific element with which the conversion is to be accomplished. For example, conversion layers of oxides, sulphides, tellurides, phosphides, etc., can be formed and the element then removed from the conversion layer by subsequent heating in the proper reducing atmosphere. it should also be noted that porous layers formed in the above manner can be impregnated with catalytic agents such as, for example, platinum salts, etc. and subsequently chemically reduced to give a highly active catalytic surface.

It was mentioned above that conversion layers other than of oxides may be formed in practicing the present invention, such as conversion layers of sulphides, phosphides, tellurides, and the like; providing, however, that the proper reducing atmosphere is later used to remove the oxydizing element. Thus, for example, where conversion layers of sulphides, phosphides or tellurides are formed, wet hydrogen, that is to say, hydrogen having a high dew point, may be used as the reducing agent. Dry hydrogen mixed with a small amount of a halogen gas, such as chlorine, may also be used as a reducing agent here. It is thus seen that a wide variety of oxydizing and reducing agents may be employed although oxygen and hydrogen were respectively used as the oxydizing and reducing agents in the detailed description in the process delineated above. What this means, therefore, is that the process of the present invention is practiced by first oxydizing the base metal structure as that term is chemically understood and then reducing the oxydized layer thusly formed, where reduction is the reverse of oxydation. Chemically speaking, when at atom of an element looses electrons it has a higher valance than it had before, that is, it either rises in positive valance or falls in negative valance. The element with the rise in valance, in this case the original porous metal structure, is said to be oxydized, while any element that takes on electrons, in this case, the conversion layer, is reduced.

It was also mentioned that porous layers formed in the above manner could be impregnated with catalytic agents and subsequently chemically reduced to give a highly active catalytic surface. This can be done by applying a reduceable salt solution, such as ammonium perrhenate ($NH_4REO_4$), to the conversion layer after it is formed. After reduction, the catalytic agent is found in the pores of the structure and also as a coating on its irregular surface. Where ammonium perrhenate is used, for example, a coating of rhenium metal is obtained over the outside surface of the structure as well as down in the pores.

Although particular steps in the process of the present invention have been delineated above by way of example, it is not intended that the invention be limited thereto. Accordingly, the invention should be considered to include any and all modifications or variations falling within the scope of the annexed claims.

Having thus described the invention, what is claimed is:

1. A process for forming a metal structure having very fine pores from one having coarser pores, said process comprising the steps of: initially heating the structure in an oxidizing atmosphere for a predetermined interval of time at a temperature in the range of temperatures from 750° Fahrenheit to 850° Fahrenheit; and additionally heating the structure in a deoxidizing atmosphere for a predetermined interval of time at a temperature in the range of temperatures from 1500° Fahrenheit to 1800° Fahrenheit, said additional heating continuing until the structure is completely deoxidized.

2. A process for forming a metal structure having very fine pores from one having coarser pores, said process comprising the steps of: initially heating the structure in air for a predetermined interval of time at a temperature in the range of temperatures from 750° Fahrenheit to 850° Fahrenheit, whereby a metal oxide coating is formed on the surface of the structure that increases the structure's surface area and reduces the size of its pores; and additionally heating the structure in a hydrogen atmosphere for a predetermined interval of time at a temperature in the range of temperatures from 1500° Fahrenheit to 1850° Fahrenheit, whereby said metal oxide coating is reduced to the original metal of the structure but with the increased surface area and the reduced pore sizes remaining.

3. The process defined in claim 2 wherein the initial heating of the structure is continued until said oxide coating is of the desired thickness and wherein the additional heating of the structure is continued until said oxide coating is completely reduced.

4. A process for converting a structure made up of tungsten fibers and having relatively coarse pores to one having relatively fine pores, said process comprising the steps of: initially heating the structure in air for about 20 minutes at about 850° Fahrenheit; and additionally heating the structure in a hydrogen atmosphere for about 15 minutes at about 1800° Fahrenheit.

5. A process for forming a metal structure having very fine pores from one having coarser pores, said process comprising the steps of: oxydizing the metal structure by heating it in an oxydizing atmosphere, said heating continuing until an oxydized layer of the desired thickness is produced over the surface of the structure; and thereafter deoxydizing said oxydized layer by heating the structure in a suitable reducing atmosphere.

6. A process involving a porous metal structure, said process comprising the steps of: heating the metal structure for a period of time in an oxydizing atmosphere to form an oxydized metal layer over the surface of the structure; applying a catalytic agent to said oxydized layer to impregnate the pores and to coat the surface thereof; and heating the structure for a period of time in a suitable reducing atmosphere to deoxydize said layer and catalytic agent material.

References Cited by the Examiner

UNITED STATES PATENTS

| | | | |
|---|---|---|---|
| 2,240,055 | 4/1941 | Sager et al. | 148—127 |
| 2,417,760 | 3/1947 | Keene | 148—127 |
| 2,607,982 | 8/1952 | Hack et al. | 29—191.6 |
| 3,095,283 | 6/1963 | Wheeler | 29—191.6 |

DAVID L. RECK, *Primary Examiner.*

HYLAND BIZOT, *Examiner.*

R. O. DEAN, *Assistant Examiner.*